US006700101B2

(12) United States Patent
Decesari et al.

(10) Patent No.: US 6,700,101 B2
(45) Date of Patent: Mar. 2, 2004

(54) POWER MANAGEMENT SYSTEM IN ELECTRICAL COOKING APPLIANCES

(75) Inventors: Roberto Decesari, Sesto Calende (IT); Andrea Corda, Luino (IT); Franco Brindani, Casciago (IT)

(73) Assignee: Whirlpool Corporation, Benton Harbor, MI (US)

( * ) Notice: Subject to any disclaimer, the term of this patent is extended or adjusted under 35 U.S.C. 154(b) by 42 days.

(21) Appl. No.: 10/166,800

(22) Filed: Jun. 11, 2002

(65) Prior Publication Data

US 2002/0189466 A1 Dec. 19, 2002

(30) Foreign Application Priority Data

Jun. 14, 2001 (IT) ..................... MI2001A1253

(51) Int. Cl.[7] ................................ H05B 1/02
(52) U.S. Cl. ..................... 219/485; 219/443.1
(58) Field of Search ................. 219/488, 485, 219/443.1, 445.1, 446.1, 457.1, 462.1, 480

(56) References Cited

U.S. PATENT DOCUMENTS

| | | | | |
|---|---|---|---|---|
| 2,327,925 A | * | 8/1943 | Myers | 219/485 |
| 2,932,715 A | * | 4/1960 | Weeks | 219/486 |
| 3,005,109 A | * | 10/1961 | Funkhouser et al. | 219/485 |
| 4,737,617 A | * | 4/1988 | Payne | 219/486 |
| 5,021,637 A | * | 6/1991 | Perala et al. | 219/485 |
| 6,157,008 A | * | 12/2000 | Brown et al. | 219/486 |
| 6,350,968 B1 | * | 2/2002 | Connolly et al. | 219/497 |

FOREIGN PATENT DOCUMENTS

| | | | |
|---|---|---|---|
| EP | 576408 | * | 12/1993 |
| WO | 95/29572 | * | 11/1995 |

* cited by examiner

*Primary Examiner*—John A. Jeffery
(74) *Attorney, Agent, or Firm*—Thomas J. Roth; Robert O. Rice; John F. Colligan

(57) ABSTRACT

A power management system in electrical cooking appliances having at least two electrical heating elements wherein the power level of the elements can be set by a user but not exceed a predetermined power level. The power management system being able to compare the total level set by the user with the predetermined power level. The power management system also being able to downgrade the total level set by the user to a lower level which does not to exceed the predetermined level, independently of the set levels. The power management system being further able to selectively downgrade the heating element operating at the higher power level by a predefined step until the total power does not exceed the predetermined power level.

8 Claims, 2 Drawing Sheets

POWER MANAGEMENT SYSTEM IN ELECTRICAL COOKING APPLIANCES

BACKGROUND OF THE INVENTION

1. Field of the Invention

The present invention relates to a power management system in electrical cooking appliances, such as cookers, cooking hobs and the like.

2. Description of the Related Art

Such appliances generally present a number of cooking points, each provided with an electrical heat source (resistance element, halogen lamps, etc.) and positioned on a worktop, plus an oven provided with one or more heat sources (generally resistance elements). The maximum power absorbed when all the heat sources are active often considerably exceeds the power limit which the meter can handle (in Italy for example this power is mainly 3 kW). This results in overloading causing the safety means (for example fuses) to blow. Even if the maximum power of the appliance is not utilized, overloading can occur if other electrical appliances are also switched on.

SUMMARY OF THE INVENTION

The main object of the present invention is to provide a system which avoids the danger of overloads during the use of cooking appliances by adjusting their absorbed power such as to reduce it while maintaining a satisfactory cooking performance.

This and further objects which will be more apparent from the ensuing detailed description are attained by the power management system in accordance with the teachings of the accompanying claims.

BRIEF DESCRIPTION OF THE DRAWINGS

The invention will be more apparent from the detailed description of a preferred embodiment thereof given hereinafter by way of non-limiting example and illustrated in the accompanying drawings, in which.

DESCRIPTION OF THE PREFERRED EMBODIMENT

Figure 1:
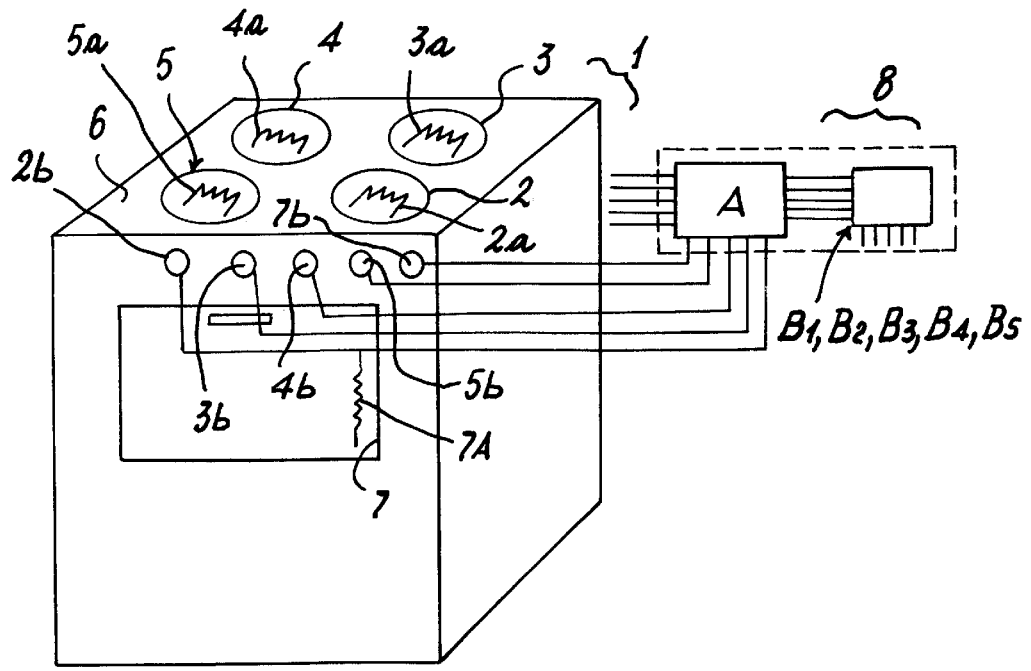
FIG. 1 is a schematic illustration of a cooking appliance provided with four heat-emitting points or elements and an oven, the electrical-electronic control part being shown separated for reasons of clarity.

With reference to the figures, the reference numeral 1 indicates overall a cooking appliance which, in this example, presents four cooking points (2, 3, 4 and 4) positioned on a hob 6 (known as the cooking hob) and on which the cooking utensils (pots, frying pans and the like) are placed. The cooking appliance of the example also presents an oven 7 below the cooking hob 6. The cooking points and oven comprise electrical heating elements 2a, 3a, 4a, 5a and 7a, such as resistance elements, halogen lamps and the like, schematically illustrated in FIG. 1 by a resistor symbol.

Although the oven 7 is described for simplicity as comprising a single electrical heating element 7a, it can be provided with a plurality of heating elements controlled by one or more knobs.

The user selects and sets the desired electrical power to be applied to the heating elements via a user interface represented in this example by knobs indicated by 2b, 3b, 4b, 5b and 6b to indicate their correspondence with the respective heating elements. The user interface can instead be represented by pushbuttons, by touch-sensitive means, by a remote control via cables, by optoelectronic receivers (in the case of remote control by infrared transmitters) or even by radio-frequency receivers. For reasons of simplicity, the ensuing description refers to knobs. These can assume various positions, each corresponding to a different power level. For example, an encoder (conventional and therefore not shown) can be associated with each knob to supply a central electrical-electronic control unit 8 with information regarding the power level set by the user via the knobs.

The resistance elements 2a, 3a, 4a, 5a of the four cooking points are sized differently, for example such that when the power requested by the user is at its maximum level, one of them can be activated at low maximum power (for example 600 Watt), two of them with intermediate power (for example 1200 or 1300 Watt) and the fourth with high power (for example 1800 Watt). For simplicity of description only, it will be assumed that each of the knobs 2, 3, 4, 5, 7 can be set not only to their zero and maximum power positions (i.e. end-of-travel positions) but also to three intermediate positions, to which different intermediate power levels correspond. It will also be assumed, as in reality has been known for some time, that the powers (or the relative levels) supplied by the electrical-electronic control unit 8 to the cooking points 2, 3, 4, 5 and to the oven 7 differ by the number of half waves or whole waves which are made to arrive at the cooking point in a predetermined time.

Figure 3:
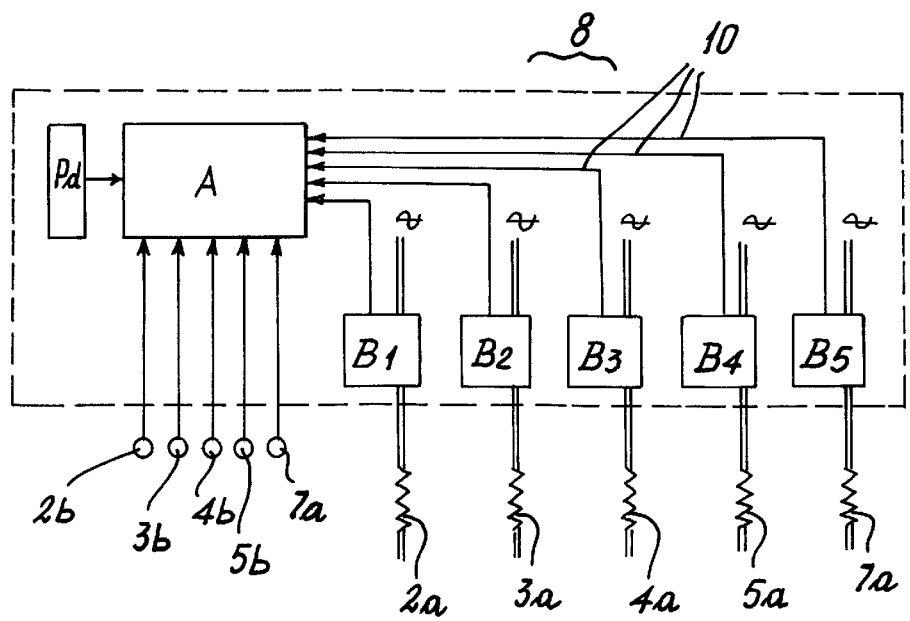
FIG. 3 is a schematic view of the control part relative to the cooking appliance.

The electrical-electronic control unit 8 is shown schematically in FIG. 3. It comprises a first management part A based on certain algorithms (which will be described with the aid of the flow diagram of FIG. 2), and a power part controlled by the first part and comprising, in this example, five conventional power devices B1, B2, B3, B4, B5 which materially provide for electrically powering the heating elements 2a, 3a, 4a, 5a, 7a by the mains.

Each of said power devices dialogues with the management part A via connections, indicated overall by 10. The management part A can be advantageously divided into two separate management units for the cooking hob and for the oven. These units dialogue via a serial line.

Pd indicates a power level set by the manufacturer or possibly by the user of the appliance 1. This power value Pd must in no case be exceeded under any operating condition of the appliance 1.

Figure 2:
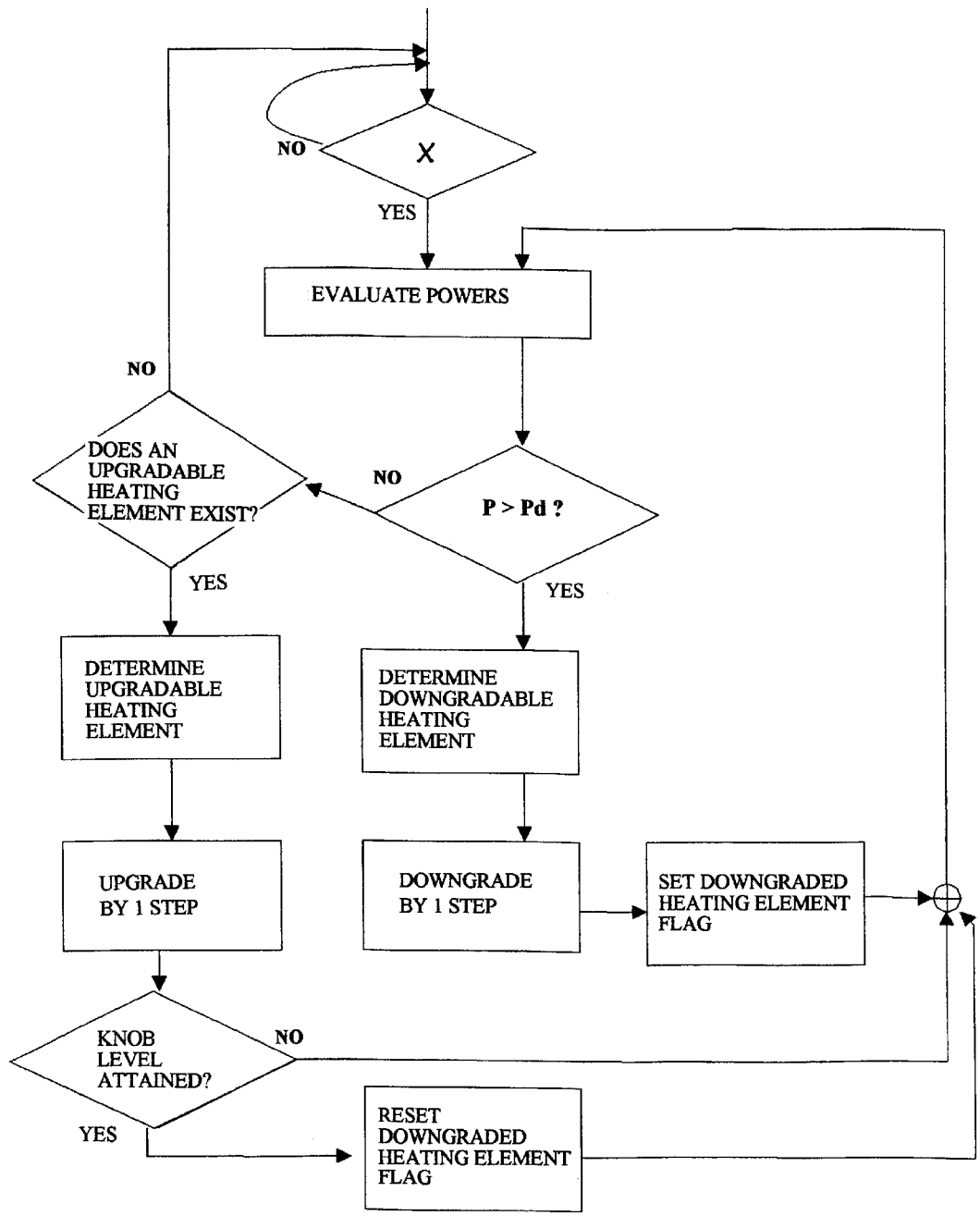
FIG. 2 shows the flow diagram on the basis of which the control part operates.

The aforedescribed system operates in the following manner, with reference to the flow diagram of FIG. 2 relative to the management part A.

The block X determines whether at least one of the knobs (2b, 3b, 4b, 5b, 7b) has been rotated away from the position corresponding to zero power level. If none has been rotated (No) the control procedure cycles. If one or more have been rotated, the power or powers fed to the one or more heating elements (resistance elements 2, 3, 4, 5 and 7) via the power device or devices (B1 - - - B5) is or are evaluated (then added together if appropriate) and the resultant measured power P is compared with the reference power Pd which is the maximum power value not to be exceeded.

If the comparison shows that the value Pd has not been exceeded and that there is therefore no need to reduce (downgrade) the power level of one of the heating elements, the cycle returns to X (checking the state or states of the knob or knobs) and so on.

If instead the comparison shows that the power requested exceeds the comparison value Pd, the downgradable heating element (the power of which is to be reduced by one step below that set by the user by means of the corresponding knob) is determined, this for example being that corresponding to the power level which at any given time is the highest set (by the knobs). By way of example and clarification, it will be assumed that the knob 3b enables the powers 0 ($1^{st}$ position) 100 ($2^{nd}$ position), 300 ($3^{rd}$ position), 500 ($4^{th}$ position) and 1200 ($5^{th}$ position) to be set, and the knob 4b the powers 0 ($1^{st}$ position), 120 ($2^{nd}$ position), 320 ($3^{rd}$ position), 550 ($4^{th}$ position) and 1300 ($5^{th}$ position). In the case of two knobs both in the $4^{th}$ position, the downgrading by one step in the power level occurs for the heating element relative to the knob 4b, which will be powered at the power of the $3^{rd}$ position (i.e. at 320), whereas the heating element relative to the knob 3b will remain at the higher level of 500, with the consequence that if a further downgrading step is necessary, this will take place on the heating element relative to the knob 3b, that element being at the higher power level.

Having hence determined where to effect the downgrading by one step, downgrading is effected and the flag for the downgraded heating element is set (as a record).

The cycle closes with the "downgraded" memory associated with each heating element being set to indicate its state.

If for example after a non-downgraded heating element has been switched off, the comparison with Pd shows that this value is no longer exceeded, the control unit checks whether there exists a heating element which can be upgraded (for example that previously downgraded), and if this element exists, the control unit upgrades by one step the element previously downgraded.

If the power level set by the knob is attained, the flag is reset and the control cycle is repeated. If it is not attained, the cycle is repeated but without resetting.

Hence in order to safeguard continuity of the power supply not only to the cooking appliance but also to other electrical appliances existing on the premises, the invention maintains a settable value of tolerable power by the preferably selective downgrading of one or more heating elements below the level set by the user.

Although reference has been made in the description to a household electrical appliance including a cooking hob and oven, the system of the invention can be dedicated individually to a hob or to an oven.

According to another characteristic of the invention, the maximum power value Pd can be advantageously set by rotating the knobs 2b, 3b, 4b and 5b, or in general via the user interface. This setting procedure requires that the household electrical appliance be switched off, said knobs be rotated to a predetermined position, and the appliance again switched on, for example by inserting the plug into the current socket. In this manner the management part A of the appliance recognizes the maximum power setting state. The user then sets this value by suitably rotating the knobs, this value being memorized after a predetermined time, following which the appliance automatically assumes the normal operating configuration. The display on the user interface (not shown) aids the user or technician in setting the appliance.

We claim:

1. A power management system in electrical cooking appliances having at least two electrical heating elements the power level of which can be set by a user but not exceed a predetermined power level, the power management system comprising comparison means for comparing the total level set by the user with the predetermined power level and configured to downgrade the total level set by the user to a lower level which does not to exceed the predetermined level, independently of the set levels, the power management system being configured to selectively downgrade the heating element operating at the higher power level by a predefined step until the total power does not exceed the predetermined power level.

2. A system as claimed in claim 1, wherein the downgrading takes place in steps.

3. A system as claimed in claim 2, wherein a stage of upgrading to a higher power level is provided if a previously downgraded heating element exists and the comparison with the predetermined power level shows that this level has not been exceeded.

4. A system as claimed in claim 1, wherein said means are represented by at least one programmed management unit which is interfaced with means for selecting the electrical heating elements to be activated and is in communication with power means by means of which the electrical heating elements are powered by the mains.

5. A system as claimed in claim 4, wherein the predetermined power level can be set via a user interface for the electrical cooking appliances.

6. A method controlling an electrical cooking appliance having at least two electrical heating elements each having a corresponding power level, the method comprising the steps of:
   a) determining a change in power level in any of the electrical heating elements;
   b) calculating the total power of the electrical heating elements;
   c) determining whether the total power exceeds a predetermined power level;
   d) downgrading the heating element by a predefined step operating at the higher power level if the total power exceeds the predetermined power level;
   e) repeating steps b)–d) until the total power does not exceed predetermined power level.

7. The method of claim 6, further comprising the step of setting a downgrade heating element flag upon downgrading a heating element.

8. The method of claim 7, further comprising the step of upgrading a heating element if a downgrade heating element has been flagged and the total power does not exceed the predetermined power level.

* * * * *